Dec. 24, 1929.  O. S. MORGAN  1,741,066
NOTEBOOK DIVIDER
Filed Jan. 16, 1929

Orville Scott Morgan
INVENTOR
BY Victor J. Evans
ATTORNEY

Patented Dec. 24, 1929

1,741,066

UNITED STATES PATENT OFFICE

ORVILLE SCOTT MORGAN, OF BALDWIN, KANSAS

NOTEBOOK DIVIDER

Application filed January 16, 1929. Serial No. 332,928.

My present invention has reference to loose leaf note books which are primarily designed for use by a student and my primary object is to provide a simple, cheap and thoroughly practical means, in the nature of a plate of preferably tough fibrous material that has apertures adjacent to its inner ends to receive therethrough the split rings that attach the sheets to the book covers, and whereby to serve as means for dividing the subject matters noted in the book into different chapters or subjects, each of said dividers having an outer reduced end upon which is printed the several subject matters in the book and whereby the student by merely opening the book in a line with the desired divider will have the desired subject readily presented to him.

A still further object is the provision of dividers for this purpose which are all similarly constructed so that a plurality of the said dividers may be arranged between the same pages of a loose leaf note book providing, of course, such pages contain different subject matters which the student desired to review.

To the attainment of the foregoing the invention resides in the improvement hereinafter described and definitely claimed.

Figure 1:
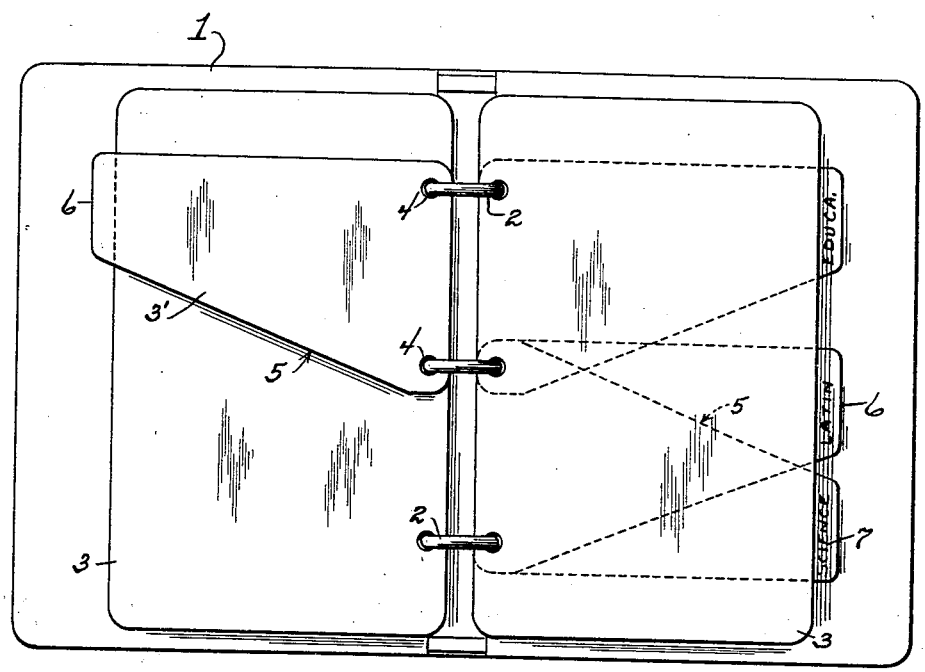
Figure 1 is a plan view of a loose leaf note book provided with my improvement, the book being open.
Figure 2:
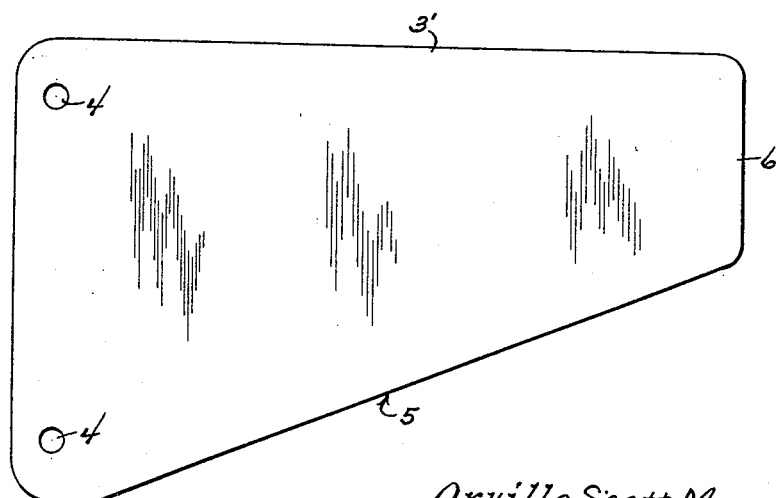
Figure 2 is a plan view of one of the devices.

The note book, broadly indicated by the numeral 1, has connected to the covers adjacent to the center thereof, the usual equidistantly spaced split and turnable rings 2 that are designed to be passed through openings in the leaves 3 of the note book.

Before proceeding with a description of the invention it is to be understood that my divider is not in the nature of an index but is simply a means whereby a student or other may readily obtain access to the pages of the note book that contain subject matter to be consulted. The dividers which constitute the subject matter of this invention are all of the same size and shape, each of which being in the nature of a flat plate 3'. The plates, however, are preferably of tough fibrous material and have adjacent to their inner edges openings or apertures 4, which are spaced from each other a distance equaling the spaced split holding rings 2 of the note book. One end from the outer edge of each divider plate 3' is inclined, as at 5, to its second and apertured end so that the outer end of each divider is reduced, as at 6, and on this reduced end there is either imprinted or pasted the title of the subject matter written in the note book. The dividers are of a length greater than that of the pages 3 of the note book so that the ends 6 of the dividers will project say approximately one-fourth of an inch beyond the outer edges of the pages 3 or project a sufficient distance to permit of the same being grasped by the fingers of the operator to readily open the book at the desired pages, such length being also necessary in order that the subject matters 7 be imprinted or pasted on the said reduced ends of the dividers.

By constructing all of the dividers of the same size and preferably of the same material a number of dividers may be attached to the split rings 2 between the same pages of a note book, this being accomplished by merely reversing the dividers as disclosed by Figure 1 of the drawings. The dividers are only thus arranged when different subject matters are indited on the opposed faces of the pages of the note book.

The simplicity and advantage of the construction will, it is thought, be understood and appreciated by those skilled in the art to which such invention relates so that further detailed description will not be required.

Having described the invention, I claim:

A note book having its pages connected by three split rings which are equidistantly spaced, dividers for the pages, each including a plate of stiff fibrous material having its inner edge provided with openings that are spaced away from each other a distance corresponding to that between two adjacent split rings and designed to receive the rings therethrough, said plate having one of its edges cut at an inclination from its outer to its inner end, said plate being of a length slightly greater than the length of the pages in the note book so that the reduced end of the plate will project beyond such pages and said projecting portion of the plate designed to have inscribed thereon data relative to the subject matter recorded in the pages of the note book between which said plate is arranged.

In testimony whereof I affix my signature.

ORVILLE SCOTT MORGAN.